United States Patent [19]

Mickelson

[11] 4,013,547

[45] Mar. 22, 1977

[54] DESULFURIZATION OF RESIDUAL PETROLEUM OILS WITH A CATALYST CALCINED AT HIGHER TEMPERATURES

[75] Inventor: Grant A. Mickelson, Yorba Linda, Calif.

[73] Assignee: Union Oil Company of California, Los Angeles, Calif.

[22] Filed: Jan. 22, 1976

[21] Appl. No.: 651,560

[52] U.S. Cl. .............................. 208/216
[51] Int. Cl.$^2$ .............................. C10G 23/02
[58] Field of Search .............................. 208/216

[56] References Cited

UNITED STATES PATENTS

| | | | |
|---|---|---|---|
| 3,322,666 | 5/1967 | Beuther et al. | 208/216 |
| 3,340,180 | 9/1967 | Beuther et al. | 208/216 |
| 3,753,894 | 8/1973 | Shoemaker et al. | 208/216 |
| 3,770,618 | 11/1973 | Adams et al. | 208/216 |
| 3,853,788 | 12/1974 | Feins et al. | 208/216 |
| 3,853,791 | 12/1974 | Feins | 208/216 |

*Primary Examiner*—George Crasanakis
*Attorney, Agent, or Firm*—Richard C. Hartman; Lannas S. Henderson; Dean Sandford

[57] ABSTRACT

Residual oils comprising asphaltenes, metal compounds, and refractory sulfur compounds are hydrodesulfurized by contact with a unique type of cobalt-molybdenum-alumina catalyst characterized by certain critical physical properties of surface area, pore volume, pore size distribution, and by a specific type of active surface area, all resulting from a final calcining step carried out at temperatures between about 1250° and 1400° F for a sufficient time to give a pore size distribution such that at least about 40% of the total pore volume is in pores in the 75–100 angstrom diameter range.

7 Claims, No Drawings

DESULFURIZATION OF RESIDUAL PETROLEUM OILS WITH A CATALYST CALCINED AT HIGHER TEMPERATURES

BACKGROUND AND SUMMARY OF INVENTION

In the hydrodesulfurization of petroleum residua, catalyst cost factors constitute a major problem. These cost factors are an aggregate of catalyst raw material and manufacturing costs, and the activity and deactivation rate of the catalysts. The problem is further aggravated by the fact that to date it has not been found commercially feasible to regenerate deactivated residua desulfurization catalysts, due principally to the deposition thereon during processing of metals such as vanadium and nickel, which are universally present in residual feedstocks.

Balancing all of the foregoing factors, the most cost-effective type of catalyst yet discovered for residual oil desulfurization is composed of minor proportions of cobalt and molybdenum dispersed in an alumina support. Early in the development of such catalysts, it become apparent that pore size distribution was an important factor. Obviously, at least a substantial proportion of the active surface area must be found in pores large enough to permit entry of the larger molecules of sulfur compounds found in residual feedstocks. This requirement would appear to call for pores having a diameter greater than about 30–50 angstroms. A complicating factor arose however when it was found that pores in the approximate diameter range of 100–2000 angstroms were detrimental, appearing to increase the deactivation rate of the catalyst. The explanation for this phenomenon appears to reside in the slow diffusion rate of the heavy feed molecules, coupled with the high ratio of volume to active surface area found in the larger pores. As a result, the feed molecules in the large pores tend to undergo thermal coking before they are effectively hydrogenated.

As a result of the foregoing considerations, several attempts have been made to optimize pore size distribution in residua desulfurization catalysts. For example, in U.S. Pat. No. 3,770,618, it is postulated that optimum deactivation rates depend upon providing a maximum pore volume in pores of 30–80 angstrom diameter, and a minimum in pores of greater than 100 angstoms. This pore distribution is achieved by compositing the alumina support with cobalt and molybdenum compounds, e.g. by impregnation, followed by drying and calcining at 1200° F. In U.S. Pat. No. 3,853,788, a resid desulfurization catalyst is prepared by first precalcining the alumina-molybdena components in intimate admixture, then impregnating with a cobalt salt and again calcining. The final calcination is carried out at about 800°–1300° F, preferably about 1200° F. Although the resulting pore structure is not disclosed, I have found that the catalysts so prepared display a pore size distribution similar to that described in the above noted U.S. Pat. No. 3,770,618.

A common feature in the preparation of Co—Mo—$Al_2O_3$ resid desulfurization catalysts, which appears throughout the prior art and is exemplified by the foregoing patents, involves a final calcination at temperatures of about 900°–1200° F, or at most 1300° F. For reasons which are not clear from the prior art, higher calcination temperatures have been eschewed; it may perphaps have been assumed that activity would thereby be reduced, inasmuch as that result has been known to ensue from the high-temperature calcination of Co—Mo—$Al_2O_3$ catalysts used for desulfurizing distillate petroleum feedstocks.

I have now discovered however, that for purposes of desulfurizing resid feedstock, calcination temperatures in the range of about 1250°–1400° F, preferably 1325°–1375° F, give catalysts of distinctly higher activity and stability than do the conventional lower calcination temperatures. Moreover, this result is obtained notwithstanding the fact that the high-temperature calcination enlarges the 30–80 A diameter pores so that over 40%, and usually over 50% of the total pore volume of the catalyst is in pores of 75–100 A diameter, and less than 25% is in pores in the prior-art-recommended 30–70 A diameter range. It would in fact appear that this moderate enlargement of pores, in conjunction with some alteration in the nature of the active surface area brought about by high temperature calcination, actually is beneficial. However, calcination at temperatures above 1400° F is detrimental, bringing about drastic reductions in surface area and mechanical strength as a result of extensive microcrystallization of aluminum molybdate and perhaps other phases. The pores are also drastically enlarged.

While I am unable to account with certainty for the improved results obtained herein, one possible explanation is that the relatively high calcination temperatures employed may tend to modify and anneal the active surface area so that some of the highly active cracking sites are moderated or eliminated, thus reducing coke forming reactions. Also, it is hypothesized that this unique type of active surface area may give increased hydrogenation rates versus cracking rates per unit of surface area in the larger pores, whereby somewhat larger pores become optimum, with resultant improved diffusion of feed molecules into and out of such pores. In any event the catalysts of this invention do provide improved activity and activity maintenance for the desulfurization of residual oils, as compared to the low-temperature-calcined, smaller pore catalysts of the type described in the above noted U.S. Pat. Nos. 3,770,618 and 3,853,788. Surprisingly however, the opposite appears to be true in the desulfurization of distillate oils; the catalysts of this invention have been found to be less active for that service than the prior art catalysts.

DETAILED DESCRIPTION

Preparation of Catalysts

In the following description, it will be understood that sufficient of the various materials and reagents should be utilized to provide a finished catalyst falling within the following composition ranges:

|  | Wt.% - Dry Basis | |
|---|---|---|
|  | Broad Range | Preferred Range |
| $MoO_3$ | 8 – 16 | 10 – 14 |
| CoO | 1 – 7 | 2 – 5 |
| $SiO_2$ (Optional) | 1 – 5 | 1.5 – 3 |
| $Al_2O_3$ | Balance | Balance |

Several conventional methods can be employed for compounding the catalyst ingredients, including the methods described in the aforesaid patents. From the standpoint of economy, preferred methods involve mulling a spray-dried alumina, or preferably a freshly prepared alumina hydrogel, with the desired proportions of molybdenum compound, cobalt compound, and optionally silica gel, together with sufficient water to provide an extrudable paste. Mulling for an extended period of time, e.g. 0.5–4 hours, is generally desirable in order to eliminate most of the large macropore structures. After mulling, the mixture is extruded, dried and calcined as herein prescribed.

In more detail, the preferred method for manufacturing the catalysts of this invention, which gives somewhat more active catalysts, involves the following steps:

1. slurrying a hydrous alumina, preferably in alumina hydrogel, with or without a minor proportion of silica hydrogel, in an aqueous solution of ammonium molybdate;
2. spray drying the resulting slurry to a water content of about 10–40 Wt.%;
3. mulling the spray-dried composite with water and sufficient of a peptizing acid to give a pH between about 3.6 and 6.0;
4. extruding the mulled composite into extrudates preferably having a maximum overall diameter between about 0.03 and 0.06 inches, and a preferred length between about 0.1 and 0.25 inches;
5. calcining the resulting extrudates at a temperature between about 900° and 1400° F;
6. impregnating the calcined extrudates with an aqueous solution of a cobalt compound; and
7. calcining the impregnated extrudates at a temperature between about 1250° and 1400° F.

As previously indicated, the calcination temperature in step (7) constitutes a critical aspect of the invention. Step (7) must be carried out at temperatures between about 1250° and 1400° F, preferably between about 1325°–1375° F, for times ranging between about 0.5 and 12 hours, usually between about 1 and 4 hours. Obviously, the calcination time and temperature ae interrelated variables, and are correlated so as to give the desired product having a total pore volume between about 0.3 and 0.8 ml/g and a total surface area between about 150 and 350 m²/g. For adequate catalyst life it is preferred to limit the volume of pores having a diameter above about 100 angstroms to between about 0.01 and 0.1 ml/g.

Calcination temperatures below about 1250° F result in a pore structure similar to that of prior art catalysts, most of the pore volume being in pores between about 30 and 80 angstroms in diameter. The pore structure desired herein is achieved by using calcination temperatures above 1250° F. Time and temperature of calcination can be readily controlled so as to give the desired product having at least about 40%, and preferably at least about 50% of its pore volume in pores of 75–100 angstrom diameter, while at the same time reducing the volume of pores having diameters below 70 angstroms to less than 25% of the total pore volume.

Pore size distribution can also be controlled to some extent by controlling the severity of the mulling operation in step (3), and the acidity of the mixture being mulled. High acidity tends to reduce pore size, and extensive mulling tends to reduce the volume of pores of diameter above 100 angstroms.

The alumina hydrogel utilized in step (1) is preferably prepared in conventional manner by precipitating from aqueous solution stoichiometrically equal quantities of aluminum sulfate and sodium aluminate. Precipitation is brought about by adding to the solution sufficient of a base such as ammonia or sodium hydroxide to being the pH to about 9–10. For the preferred compositions containing silica gel, it is peferred to incorporate a washed silica hydrogel into the aluminum sulfate-sodium aluminate solution prior to precipitation of the alumina hydrogel. After precipitation is complete, the resulting aqueous slurry is then filtered and washed exhaustively in conventional manner to remove essentially all sodium and sulfate ions. The final gelatinous filter cake generally contains between about 10–15 weight-percent solids.

The filter cake prepared as described above is then reslurried in sufficient of an aqueous ammonium molybdate solution to provide a spray-dryable mixture, normally containing between about 6–12 weight-percent of total solids. Any suitable water-soluble ammonium molybdate salt may be utilized such as ammonium dimolybdate, or preferably ammonium heptamolybdate. Spray-drying is carried out under conventional conditions well known in the art to obtain a powdered product in which the alumina is in the form of a hydrate such as boehmite. The spray-dried material normally contains about 10–40 weight-percent of water.

In step (3) the spray-dried alumina-molybdena powder is mixed with sufficient water, normally about an equal weight proportion, to provide an extrudable mixture. The pH of the mixture is then adjusted to about 3.6–6.0 with an added acid such as acetic acid or nitric acid, the latter being preferred. The mixture is then mulled for a suitable period of time, normally about 1–5 hours, to obtain a homogeneous extrudable mixture. The mulled mixture is then extruded in conventional manner, dried, and calcined at the indicated temperatures.

The cobalt impregnation step is conventional in nature and hence need not be described in detail. Soaking or immersion techniques may be utilized, but spray impregnation is preferred. Suitable water-soluble cobalt compounds include cobalt nitrate, cobalt acetate, cobalt sulfate and the like, as well as any of the various water soluble ammino-complexes of cobalt salts. Cobalt nitrate is preferred. Following impregnation, the catalyst is dried in conventional manner at e.g. 200°–300° F and calcined at the indicated temperatures.

The size and shape of the catalyst extrudates prepared as described above is another important consideration. In the art of hydrodesulfurizing petroleum residua it is known that a more effective utilization of the catalyst is obtained by maximizing the exterior surface area of the catalyst particles, relative to their volume. The very heavy sulfur compounds in residual oils diffuse very slowly into the pores of the catalyst particles, and hence the interior portions thereof tend to be relatively ineffective, most of the desired conversion of sulfur compounds taking place near the external surface areas thereof. Many attempts have been made to overcome this difficulty, including the use of finely powdered catalysts in the form of a slurry, an even the use of homogeneously dissolved or colloidal catalysts. To date however none of such processes have proven to be practical, mainly because of difficulties involved in separating the treated oil from the catalyst. Present day technology dictates the use of macroparticles of catalyst arranged in a fixed bed, through which the preheated oil plus hydrogen is passed, but it is in such processes that the above noted diffusion problems are encountered.

One method for alleviating such diffusion problems resides in minimizing the size of the catalyst particles. However this approach is subject to limitations; catalyst extrudates below about 1/32-inch in diameter lead to excessive pressure drops through the reactor due to the reduced interstitial void space in the catalyst bed. Excessive breakage and production of fines may also occur. U.S. Pat. No. 3,674,680 to Hoekstra et al represents one attempt to overcome these difficulties. In this patent, small extrudate catalyst particles are utilized wherein all points within any particle are less than about 0.015 inch from a surface of the particle. Pressure drop problems, and to some extent mechanical strength problems, normally associated with use of such small particles are alleviated by forming the extrudates in various non-cylindrical shapes, e.g. shapes having the cross sectional configuration of a cross or clover-leaf, thereby providing more interstitial void space in the catalyst bed. The special shapes described also provide a substantial increase in the ratio of exterior surface area to volume, thereby increasing the efficiency of utilization of the catalyst. Any of such special shapes are operable herein.

To summarize, whether cylindrical or non-cylindrical catalyst shapes are chosen, it is found that the following combination of catalyst dimensions is optimum from the standpoint of the best compromise between catalyst activity, deactivation rates, pressures drops and catalyst breakage:

| Catalyst Dimensions, Inches | Broad Range | Preferred Range |
|---|---|---|
| Length | 0.1 – 0.25 | 0.12 – 0.2 |
| Diameter | 0.03 – 0.06 | 0.04 – 0.05 |
| Ratio, External Surface Area/Vol, in$^{-1}$ | 70 – 160 | 90 – 145 |

An especially preferred catalyst shape for use herein is one having a "trilobal" or three-leaf clover type of cross section, such as that illustrated for example in FIG. 5-A of U.S. Pat. No. 3,857,780. For purposes of the present invention such a cross-sectional shape may be defined as a symmetrical trilobe in which the perimeter of each lobe is defined by a 180°–270° arc of a circle having a diameter between about 0.02 and 0.03 inches. The 180° arc trilobe is optimum from the standpoint of mechanical strength, but packed beds thereof are deficient in void space, thus presenting pressure drop problems. The 270° arc trilobe is optimum from the pressure drop standpoint, but is somewhat fragile in that the lobes tend to break away from each other. An optimum combination of properties appears to be exhibited by trilobe extrudates wherein each lobe is defined by a 210°–250° arc.

Use of Catalysts

The above catalysts may be effectively utilized for the desulfurization of substantially any topped crude oil, vacuum residua, atmospheric residua, or mixtures thereof with each other or with other petroleum products. The general characteristics of such feedstocks are as follows:

| Feedstock Properties | |
|---|---|
| Sulfur, wt.% | 1 – 7 |
| Nitrogen, wt.% | 0 – 2 |
| Metals, ppm | 10 – 500 |
| Vanadium, ppm | 10 – 400 |
| Asphaltenes, wt.% | 1 – 20 |
| Percent Boiling above 900° F | 20 – 100 |
| Gravity, ° API | −5 – 30 |

The operative hydrodesulfurization process conditions fall within the following ranges:

| Process Conditions | Broad Range | Preferred Range |
|---|---|---|
| Temp. ° F | 650–850 | 700–825 |
| Pressure, psig | 1000–3000 | 1500–2500 |
| H$_2$/oil Ratios, MSCF/B | 0.5–8 | 2–5 |
| LHSV | 0.1–2 | 0.2 –1 |

Those skilled in the art will readily understand that temperatures and space velocities can be suitably adjusted to provide any desired degree of desulfurization, up to about 95%. It is desirable however to avoid combinations of high space velocities with high temperatures, which combinations generally result in excessive cracking, coke formation and rapid catalyst deactivation. In general, a sufficiently low space velocity should be used to permit the desired degree of desulfurization at a sufficiently low temperature to avoid production of more than about 10–15 volume percent of light ends boiling below the initial boiling point of the feedstock. Operating in this manner, run lengths of at least about 90 days are normally obtainable, even at desulfurization levels above 75%.

The following examples are cited as illustrative of the invention but are not to be construed as limiting in scope:

EXAMPLES 1–4

A catalyst (A), similar to that described in U.S. Pat. No. 3,853,788, and containing by weight 4% CoO, 12% MoO$_3$, 2% SiO$_2$, and the balance alumina, was prepared as follows:

The calculated proportions of a freshly prepared, washed alumina hydrogel, a freshly prepared, washed silica hydrogel and ammonium heptamolybdate were slurried together in sufficient water to provide a spray-dryable mixture containing about 8 wt. % total solids. The resulting slurry was then spray-dried under conventional conditions to obtain a powder containing about 30 wt.% H$_2$O. The spray-dried powder was then mulled for about 4 hours with about an equal weight of water and sufficient added nitric acid to provide a pH of 4.8. The mulled mixture was then extruded in the form of a symmetrical trilobe, the cross-sectional periphery of each lobe being defined by about a 240° arc of a circle having a diameter of about 0.026 inches. The ratio of external surface area/volume of the resulting extrudates was about 120 reciprocal inches.

After calcining for 1 hour at 1200° F, the extrudates were then spray impregnated with sufficient of a 20 wt.% solution of cobalt-nitrate-hexahydrate to provide the calculated cobalt content. After aging for 2 hours, the impregnated extrudates were then dried at 250° F and calcined for 1 hour at 1200° F. The physical properties of the final product were then determined by standard analytical procedues, and the results are reported in Table 1.

Three additional catalysts (B), (C) and (D) were then prepared by calcining portions of catalyst (A) for 2 hours at temperatures of 1300°, 1350° and 1450° F, respectively. The physical properties of these catalysts are reported in Table 1 for comparison with catalyst (A):

TABLE 1

| Percent of Pore Volume in Pores of Diameter, A: | Catalyst and Calcination Temp., ° F | | | |
|---|---|---|---|---|
| | A 1200° | B 1300° | C 1350° | D 1450° |
| 0 – 30 | 0 | 0 | 0 | 0 |
| 30 – 70 | 29 | 20 | 8.5 | 0 |
| 30 – 75 | 61.5 | 32 | 11 | 0 |
| 75 – 100 | 29 | 56 | 72 | 0 |
| 100 – 200 | 2 | 2 | 9.5 | 25 |
| >200 | 7.5 | 10 | 7.5 | 75 |
| BET Surface Area, m²/g | 300 | 278 | 249 | 94 |
| Pore Volume, ml/g | 0.52 | 0.51 | 0.52 | 0.50 |
| Gamma Al₂O₃ Crystallite Size, A | 29 | 41 | 44 | 83 |
| Crushing Strength, Lbs | 11.9 | N.A. | 13.5 | <4 |

It will be noted that catalysts (B) and (C) displayed the desired pore size distribution, while retaining most of their surface area and crushing strength. Catalyst (D), calcined at 1450° F, displayed excessive macropore volume, and had lost most of its surface area and crushing strength. Since this catalyst did not display the necessary physical qualities for a commercial catalyst, it was not tested for activity in the succeeding examples.

EXAMPLES 5–6

The foregoing catalysts (A) and (C), after being presulfided, were activity-tested for desulfurization of a Kuwait atmospheric resid having a 50% boiling point of 942° F, a gravity of 16.7° API, a sulfur content of 3.7 weight-percent, an asphaltene content of 5.6 weight-percent, a vanadium content of 33 ppm and a nickel content of 13 ppm. The tests were carried out over a 280 hour period at a hydrogen partial pressure of 1500 psig, liquid hourly space velocity of 0.25, and a hydrogen/oil ratio of 4000 scf/b. The temperature was adjusted throughout the runs to achieve the target 92% desulfurization. The results were as follows:

TABLE 2

| Time On-Stream, Hours | Temp. Required⁽¹⁾ for 92% Desulfurization, ° F | |
|---|---|---|
| | Catalyst A | Catalyst B |
| 40 | 687 | 677.5 |
| 100 | 689 | 679 |
| 160 | 690.5 | 681 |
| 220 | 692 | 682.5 |
| 280 | 694 | 684 |
| Relative Activity (second order kinetics) | 100 | 120 |

⁽¹⁾These temperature values picked from smoothed curves plotted to represent 35 actual data points.

The definite superiority of catalyst B over catalyst A is readily apparent. However, suceeding Examples 7–8 will show that this superiority does not prevail in the desulfurization of distillate oils.

The runs of Examples 5–6 were continued in additional 21 days at 0.5 LHSV, after which the relative activities were 100 for catalyst A and 131 for catalyst B, thus demonstrating a significantly lower deactivation rate for catalyst B.

EXAMPLES 7–8

Catalysts A and C were tested for desulfurization and denitrogenation activity, using a light diesel oil feed. At 700 psig, 3000 scf/bbl feed and 2.5 LHSV, the results were as follows:

TABLE 3

| | Catalyst | |
|---|---|---|
| | A | B |
| Temp. of Test, ° F | 675 | 675 |
| Relative Activity, | | |
| Denitrogenation | 100 | 89 |
| Desulfurization | 100 | 88 |
| Temp. of Test, ° F | 700 | 700 |
| Relative Activity, | | |
| Denitrogenation | 100 | 90 |
| Desulfurization | 100 | 82 |

It is thus evident that catalyst A is a superior catalyst for the hydrofining of distillate oils, but catalyst B is definitely superior for the desulfurization of residual oils.

The following claims and their obvious equivalents are believed to define the true scope of the invention.

I claim:

1. A process for the hydrodesulfurization of a residual petroleum feedstock, which comprises contacting said feedstock in admixture with added hydrogen at elevated desulfurization temperatures and pressures with a catalyst consisting essentially of a sulfided composite of about 1–7 weight-percent CoO and 8–16 weight-percent MoO₃ supported on a carrier consisting essentially of activated alumina, said catalyst being further characterized by:
   a. a total surface area between about 150 and 350 m²/g;
   b. a total pore volume between about 0.3 and 0.8 ml/g, at least about 40% of said pore volume being in pores of 75–100 A diameter; and
   c. a pore volume in pores about 100 A diameter of between about 0.01 and 0.1 ml/g;

said catalyst having been calcined at a temperature between about 1250° and 1400° F prior to said contacting.

2. A process as defined in claim 1 wherein at least about 50% of said pore volume is in pores of 75–100 A diameter, and less than about 25% is in pores of 30–70 A diameter.

3. A process as defined in claim 2 wherein said catalyst was calcined for at least about 1 hour at temperatures between about 1325° and 1375° F.

4. A process as defined in claim 2 wherein said catalyst is in the form of consolidated particles having a ratio of external surface area to volume of between 70 and 160 reciprocal inches.

5. A process for the hydrodesulfurization of a residual petroleum feedstock containing 1–20 weight-percent asphaltenes and 10–500 ppm metals, which comprises contacting said feedstock in admixture with 500–8,000 SCF/B of hydrogen at a temperature of 650°–850° F and a pressure of 1000–3000 psig, with a catalyst consisting essentially of a sulfided composite of 1–7 weight-percent CoO and 8–16 weight-percent $MoO_3$ supported on a carrier consisting essentially of activated alumina, said catalyst being further characterized by:

a. a total surface area between 150 and 350 m²/g;
  b. a total pore volume between about 0.3 and 0.8 ml/g, at least about 40% of said pore volume being in pores of 75–100 A diameter;
  c. a pore volume in pores above 100 A diameter of between about 0.01 and 0.1 ml/g; and
  d. a particle-form shape having a ratio of external surface area to volume of between 70 and 160 reciprocal inches;

said catalyst having been prepared by the steps of:

1. slurrying an alumina hydrogel in an aqueous solution of ammonium molybdate;
2. spray drying the resulting slurry to a water content of about 10–40 weight-percent;
3. mulling the spray-dried composite with water and sufficient acid to give a pH between 3.6 and 6.0;
4. extruding the mulled composite into extrudates having a maximum overall diameter between 0.03 and 0.06 inches and a length between 0.1 and 0.25 inches;
5. calcining the resulting extrudates at a temperature between about 900° and 1400° F;
6. impregnating the calcined extrudates with an aqueous solution of a thermally decomposable cobalt compound; and
7. calcining the impregnated extrudates at a temperature between 1250° and 1400° F.

6. A process as defined in claim 5 wherein at least about 50% of said pore volume is in pores of 75–100 A diameter, and less than about 25% is in pores of 30–70 A diameter.

7. A process as defined in claim 6 wherein said catalyst is calcined for at least about 1 hour at temperatures between about 1325° and 1375° F in step (7).

* * * * *